INVENTOR.
Norman McQueen
BY
Paul Fitzpatrick
ATTORNEY

United States Patent Office 3,332,233
Patented July 25, 1967

3,332,233
ISOCHRONOUS GOVERNING DEVICE FOR ENGINES EMPLOYING MODULATION OF FLUID PRESSURES
Norman McQueen, Birmingham, Mich., assignor to General Motors Corporation, Detroit, Mich., a corporation of Delaware
Filed July 1, 1965, Ser. No. 468,784
8 Claims. (Cl. 60—39.28)

ABSTRACT OF THE DISCLOSURE

A governor in which the droop is eliminated by a speed-responsive device modulating pressures which affect the output of a fuel-regulating governor device to isochronize the system.

My invention is directed to fuel controls for gas turbine engines to provide isochronous governing. The invention is embodied in an addition to a previously known fuel control for a free turbine engine which has means responsive to compressor discharge pressure of the gas turbine to control fuel during acceleration and governors to control fuel during steady state running and prevent overspeed.

In the prior art fuel control, one governor responds to speed of the gas generator and the other to speed of the power turbine. Both governors act upon means to vary fuel supplied to the engine and thus control the speeds of the turbines. In general, the fuel may be controlled by either governor, depending upon the relative settings of the two governors and the load on the engine. The gas generator governor may be considered to some extent as means for determining the power available from the engine, while the power turbine governor determines the speed at which output shaft is driven if there is sufficient power. The gas generator governor determines the gas horsepower of the power turbine and this, in connection with the load, determines power turbine speed. On the other hand, if the gas generator governor is set to high power but the load is light, the power turbine governor will reduce fuel to hold the power turbine on speed. In some cases the power turbine may be connected to a load which is itself speed controlled, such as a variable pitch propeller or an alternator in an interconnected system. In other cases minor variations in speed of the power turbine may be acceptable. However, there are some applications where an accurate constant speed output of the power turbine is needed as, for example, in generating electric power at an accurate frequency.

My invention is embodied in an improvement upon this previously known and used gas turbine control having a proportional governor or, in other words, in which the speed of the power turbine varies appreciably with load due to the slope of the governor characteristic curve. My invention involves means to modify the action of the power turbine governor to secure isochronous governing. The invention may be applied to single-shaft gas turbines in which only a single governor is provided responding to speed of the entire engine.

The nature of the invention and the advantages thereof will be apparent to those skilled in the art from the succeeding detailed description of the preferred embodiment of the invention and the accompanying drawings thereof.

Figure 1:
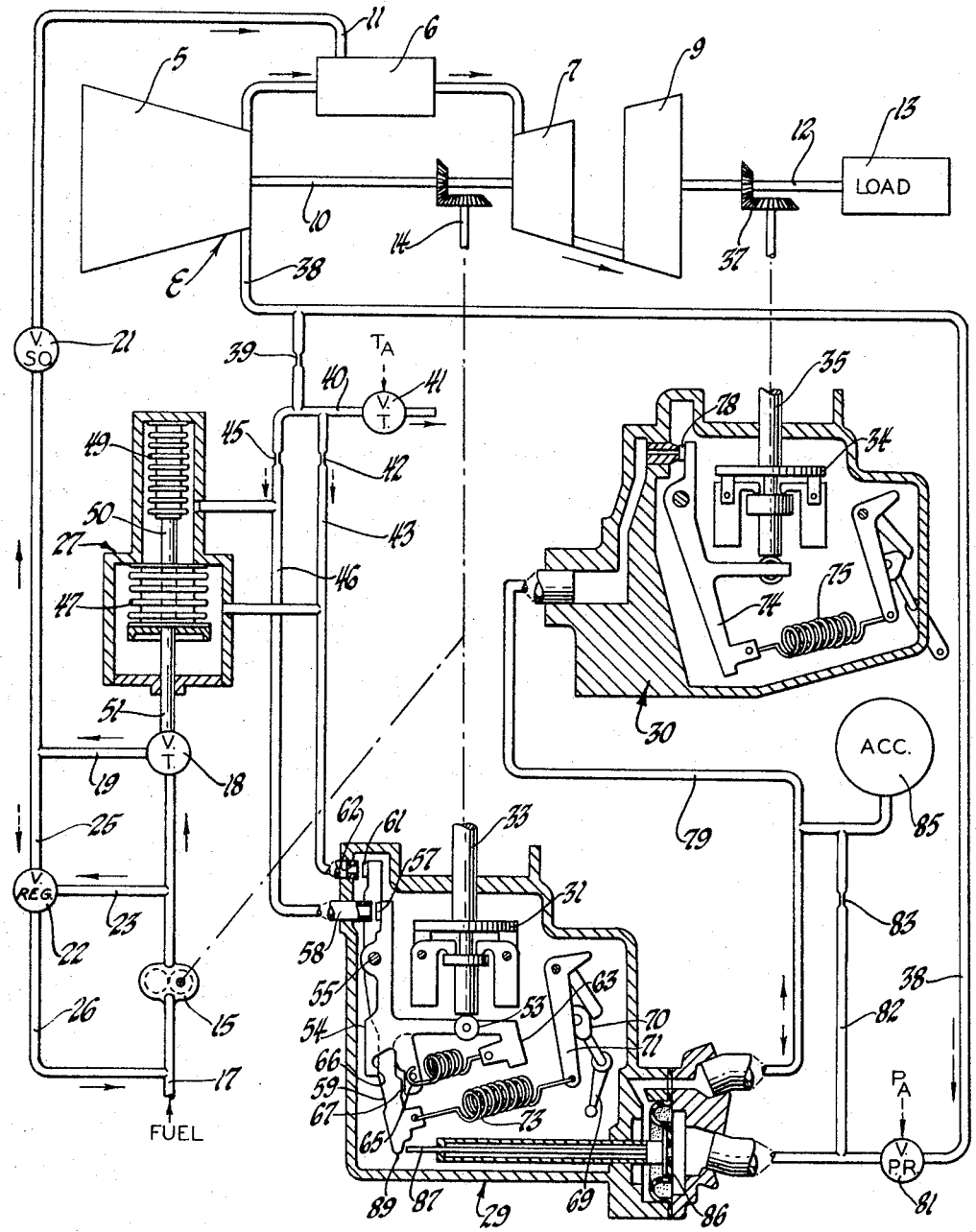
FIGURE 1 is a schematic diagram of the basic elements of a prior art fuel supply and control system associated with a gas turbine engine of the gas-coupled or free turbine type.

Referring first to FIGURE 1, a gas turbine engine E, illustrating schematically, includes a compressor 5, combustion apparatus 6, a gas generator turbine 7, and a power turbine 9. The gas generator turbine drives the compressor through a shaft 10 and the compressor supplies air to the combustion apparatus. Fuel supplied through a line 11 is burned in the combustion apparatus and the resulting combustion products flow first through the gas generator turbine 7 and then through the power turbine 9, from which they are exhausted to atmosphere. The power turbine is coupled by suitable transmission means indicated by a shaft 12 to any load device 13 which may, for example, be a lifting or propelling rotor of an aircraft.

The gas generator turbine 7 is geared to an accessory drive shaft 14 which is coupled to a fuel pump 15. This pump is supplied with fuel through a line 17 and delivers the fuel through a fuel metering valve 18 of the throttling type into line 19 which is connected through a shutoff valve 21 to the engine fuel inlet line 11. A regulating valve 22 maintains a constant pressure drop across the metering valve 18. The regulating valve is connected to the pump outlet by a line 23 and to the fuel line 19 by a branch line 25. The valve opens to return fuel through a bypass line 26 to the pump inlet so as to maintain a predetermined pressure drop across metering valve 18. The shutoff valve 21 is provided to close the fuel line when the engine is shut down. A pump pressure relief valve (not illustrated) is ordinarily provided also.

The metering valve 18 is operated by a pneumatic actuator 27 which operates primarily in response to compressor discharge pressure of the engine to meter or limit fuel during acceleration of the engine. The actuator 27 also is controlled directly or indirectly by a gas generator control 29 and a power turbine governor 30. The gas generator control responds to the speed of turbine 7 by means of a flyweight device 31 on a shaft 33 coupled to shaft 14 driven by the gas generator. The power turbine governor includes a flyweight speed responsive device 34 on a shaft 35 coupled through gearing 37 to the power turbine shaft 12.

As will be described, the gas generator control 29 acts as a governor to hold the gas generator at the preset speed. The power turbine governor 30 acts to transmit a force to the gas generator control to modify its action and vary fuel if the power turbine speed varies from a preset value. These controls act by bleeding down or, in other words, modulating the pressures derived from the compressor of the gas turbine and fed to the actuator 27 to control the fuel metering valve 18.

Explaining this more fully, an input of the fuel control of compressor discharge pressure is obtained through a line 38. Line 38 is connected through an orifice 39 to a manifold 40. A throttling valve 41 which connects manifold 40 to an atmospheric vent is coupled to means responsive to ambient atmospheric temperature. Valve 41, coacting with orifice 39, serves to modify compressor discharge pressure in manifold 40 in response to ambient temperature and thereby modify fuel flow in response to ambient temperature. Manifold 40 is connected through an orifice 42 to a governing pressure line 43 and through an orifice 45 to a fuel enrichment pressure line 46. These lines are connected to the actuator 27 and to the gas generator control 29.

The actuator 27 comprises two coaxial bellows 47 and 49. Open bellows 47 is of larger area than bellows 49, which is evacuated. Line 46 is connected to the space between the bellows and line 43 connects to the outside of bellows 47. These two bellows are connected to each other by a rod or stem 50 and to the metering valve 18 by a suitable linkage indicated by a continuation 51 of reciprocable rod 50. The arrangement is such that contraction of the bellows increases fuel flow. The valve is biased to reduce fuel by a spring force which may be from the inherent resiliency of the bellows 47 and 49. Thus, when the pressure in lines 43 and 46 increase concurrently with an increase in compressor discharge pressure this acts upon the difference of area of the two bellows to increase fuel flow. Speed is limited by bleeding air from line 43 by the gas generator control to be described, thus reducing fuel. Reduction in the fuel enrichment pressure in line 46 supplied to the actuator between the bellows acting upon the difference of areas of the two bellows will increase fuel. In the operation of the system, this reduction in the enrichment pressure is also accomplished by the gas generator control.

Proceeding to the gas generator control 29, the flyball speed responsive device 31 acts against a roller 53 on a fuel enrichment lever 54 pivoted on a fulcrum 55. The opposite end of lever 54 mounts a half-ball valve member 57 which normally closes against a seat 58 connected to enrichment pressure line 46. A governor lever 59, also pivoted on the fulcrum 55, mounts a half-ball valve member 61 which may close the seat 62 at the end of governing pressure line 43. The enrichment lever 54 is coupled to an extension 63 of the governor lever by a light coil spring 65. When the engine is at rest or is operating below a predetermined speed this spring maintains an abutment 66 on the enrichment lever in contact with the governor lever. When the speed reaches the predetermined value, the flyball device rocks the enrichment lever until a second abutment 67 thereon is brought against the governor lever, this being accompanied by a slight extension of spring 65. This rocking motion of the enrichment lever opens the valve 57 and bleeds air from the line 46.

The governor lever 59 opens the valve 61 at a higher value of speed which could be a fixed value but, as illustrated, may be variably set by a gas generator control lever 69 which through a cam 70 rotates a bellcrank 71. A speeder spring 73 is connected between the bellcrank 71 and the governor lever 59. At some speed of the gas generator, depending upon the governor setting, the flyball device opens valve 61 to bleed line 43 and thus reduces fuel flow.

Proceeding now to the power turbine governor, this embodies a governor essentially the same as that just described in the gas generator control except that the enrichment lever is absent and the flyball device 34 works directly on a governor lever 74. Lever 74 is biased by a spring 75 variably set by power turbine speed control 77. Lever 74 controls a half-ball valve 78 which, upon overspeed of the power turbine, opens to bleed air from a line 79. Reduction of pressure in line 79 is effective to modify the action of the gas generator governor. Compressor discharge pressure line 38 is connected through a pressure regulating valve 81 to a reference pressure line 82. Regulating valve 81 responds to ambient pressure and to the pressure in line 82 to hold the reference pressure at a fixed level above atmospheric pressure. Line 82 is connected through an orifice 83 to power turbine overspeed line 79. Opening of valve 78 upon power turbine overspeed reduces the control pressure in line 79 because of the drop through orifice 83. An accumulator 85 connected to line 79 slows the rate of change in control pressure in line 79 in response to overspeed. Lines 79 and 82 are connected to opposite sides of a diaphragm 86 in the gas generator control 29. This diaphragm is connected to a push rod 87 which may engage the end 89 of the governor lever 59. The pressures in line 79 and 82 will be equal as long as valve 78 is closed. However, when this valve opens and reduces the pressure in line 79 the resulting pressure differential acts upon diaphragm 86 to exert a force on the governor arm 59 tending to open valve 61 and thus reduce fuel.

To summarize, the prior art fuel control embodies pressure responsive means 27 for regulating engine fuel which basically responds to compressor discharge pressure. The speed of the engine is limited and held at the desired value by bleeding pressure either directly through action of the gas generator control or indirectly through action of the power turbine governor on the gas generator control. The gas generator control acts at a given value of engine speed to open the enrichment valve 57, the resulting decrease in the enrichment pressure raising the fuel-air ratio in the engine. This action takes place at a speed above the surge-critical speed range. Depending upon the load and the settings of the speeder springs, either the gas generator control or the power turbine governor may limit fuel. In the former case, the power available to the power turbine is controlled, and in the latter case the speed of the power output shaft 12 is controlled.

Figure 2:
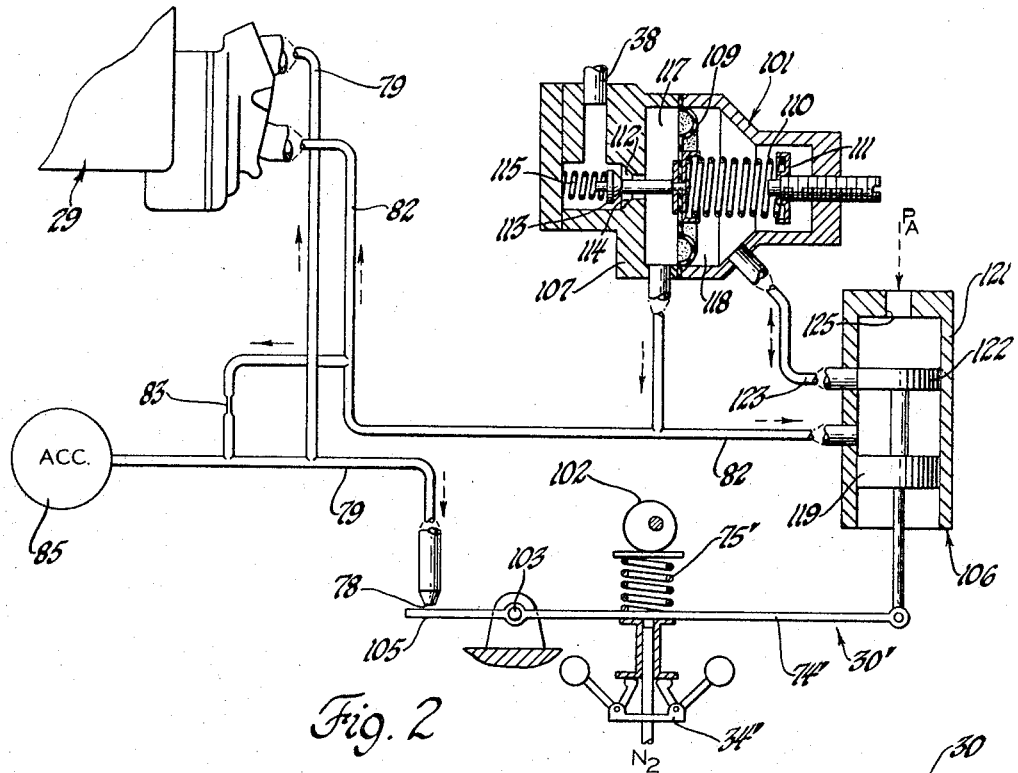
FIGURE 2 is a partial schematic fuel control drawing illustrating the addition of one form of my invention to the system of FIGURE 1.
Figure 3:
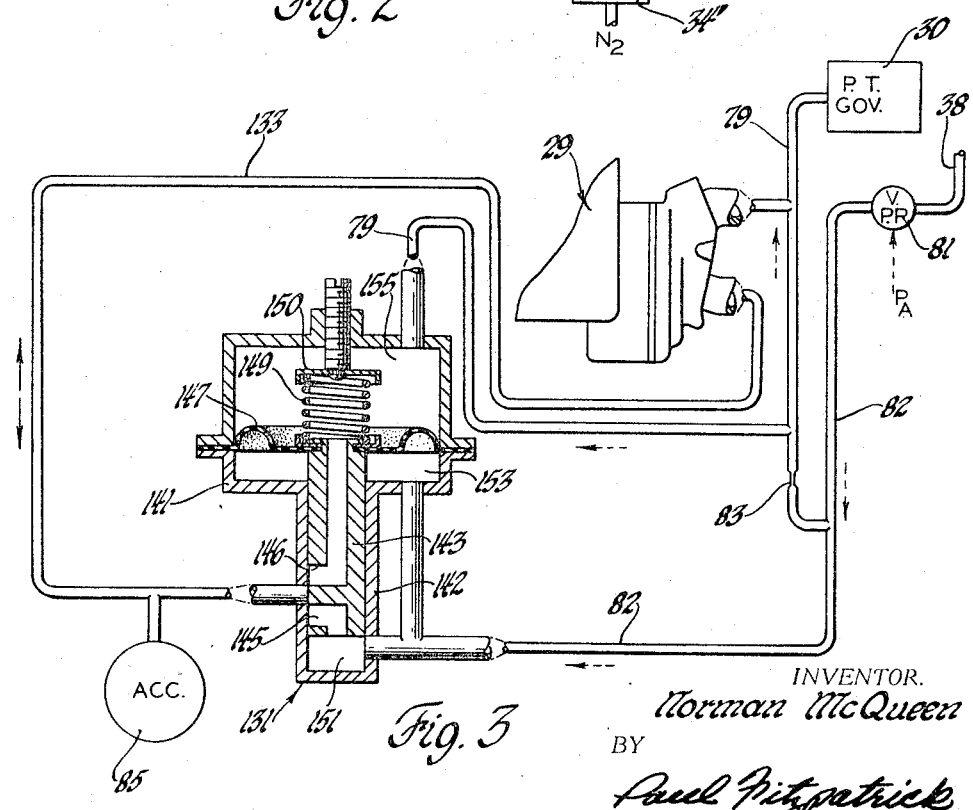
FIGURE 3 is a partial schematic fuel control drawing illustrating the addition of a second form of my invention to the system of FIGURE 1.

Since my invention is particularly concerned with control of power turbine speed, it embodies means to modify the action of the power turbine governor on the fuel controlling means of the prior control shown in FIGURE 1. Both forms of my invention are characterized by simplicity of structure, the addition of a minimum additional structure to the prior control, and ease of integration of the new elements providing the isochronous control with the prior art gas turbine control. Essentially, both of the preferred embodiments of the invention involve means for varying the reference pressure which is applied to one face of diaphragm 86 in the control 29. The principle may be explained briefly; when the power turbine governor acts, for example, to reduce fuel to prevent overspeed, it reduces the control pressure so that diaphragm 86 acts upon the fuel controlling means to reduce fuel. A governor such as governor 30 has an inherent droop characteristic. The reduction in control pressure necessarily involves a slight opening in valve 78 which is accompanied by a slight increase in speed of the governor to hold the valve in the wider open position against the force of spring 75. According to my invention, the reference pressure which is supplied to the other face of diaphragm 86 is controlled and responds to this phenomenon to the extent necessary to compensate for the shift in the operating point in the engine due to the slope of the governor characteristic. The two embodiments of the invention accomplish this by different means. In FIGURE 2, the reference pressure is varied by an integrating servo valve which responds directly to movements of the governor from its position corresponding to the preset speed. In the form of FIGURE 3, variations in the control pressure act through a pressure regulating valve to change the reference pressure accordingly.

Referring first to FIGURE 2, this figure shows only those parts of the system needed to illustrate the modification of the prior art control. The metering valve 18, its actuator 27, and the gas generator control 29 remain as before. The gas generator control is indicated fragmentarily in FIGURE 1. The power turbine governor is modified to include a control valve, and a different type of regulating valve 101 is substituted for valve 81. The modified power turbine governor is identified by 30' in FIGURE 2, and the structure is illustrated schematically. The speeder spring 75' may have means for varying or adjusting the speed setting such as a cam 102. As illustrated, the flyweight device 34 works against the spring 75' to rotate an arm 74' about a fixed pivot 103. An end 105 of arm 103 cooperates with the end of line 79 to define the control pressure bleed orifice 78. The fixed orifice 83 and accumulator 85 remain as in FIGURE 1. Orifice 83 is supplied from the reference pressure line 82 which in turn is supplied from the regulating valve 101. The governor operated rocker arm 74′ also operates a three-way valve 106 which modifies the action of regulating valve 101.

Proceeding to the regulating valve 101, this comprises a body 107 within which is mounted a diaphragm 109 biased by a compression spring 110 having an adjustable abutment 111. Diaphragm 109 and spring 110 act upon a valve poppet 113 which cooperates with the seat 114 to provide a throttling valve 112. A light spring 115 acts to bias the poppet towards closed position. Compressor discharge pressure is supplied trough line 38 and past valve 112 into a chamber 117 where it acts upon diaphragm 109 in the direction to close valve 112. Pressure downstream of valve 112 is the reference pressure supplied to line 82. This pressure thus depends upon the force of spring 110 and the pressure in chamber 118 back of diaphragm 109.

The pressure in chamber 118 is controlled by the three-way valve 106, which is a conventional valve including a spool 119 coupled to and reciprocated by governor operated lever 74′. Valve spool 119 is a balanced spool reciprocable in a cylinder 121. A land 122 of the spool controls flow between a line 123 leading from chamber 118 of regulating valve 101 and either the reference pressure line 82 or ambient pressure admitted to the cylinder through a port 125. The operation of the gas turbine control embodying this device is the same as previously described with reference to FIGURE 1 except that reference pressure in line 82 is not fixed. It is variable in response to action of the speed responsive device 34′, and this results in resetting of governor 34′ to provide isochronous operation of the power turbine.

The operation of the device of FIGURE 2 may be easiest understood by considering the sequence of events resulting from a change in power turbine load with the governor settings fixed. Assuming the load decreases, the power turbine will turn faster and the flyball device 34′ will compress spring 75′ and open valve 78 slightly. This increases the flow through bleed orifice 83 from reference pressure to control pressure and thereby increases the difference between these two pressures. The pressure differential acting on the diaphragm 86 in control 29 opens bleed valve 61 to a slightly greater extent. As a result, servo 27 reduces fuel flow to the engine, the gas horsepower decreases, and the power turbine decelerates. In a system having proper time constants and damping this action will take place relatively smooth with slight, if any, oscillation and no great delay. In the system of FIGURE 1, when the system has stabilized at the lower value of load, the power turbine will be turning slightly faster because the valve 78 has to be slightly more open than under the previous load. This is the basis for the slope of the governor characteristic.

Continuing to the isochronous mechanism; when valve 78 is opened, control valve 106 also is moved by the lever 74′ and, in this case, it bleeds reference pressure from line 82 into chamber 118 as long as power turbine speed error remains. This will increase the force urging regulating valve 112 open and thereby increase the value of reference pressure 82, which is maintained by valve 101 a constant amount above the pressure in chamber 118. This action takes place as an integrating action relatively gradually as compared to the direct governing action. The resulting increase in reference pressure in line 82 acts against diaphragm 86 to reduce fuel and thereby bring the power turbine back to isochronous speed. The control pressure in line 79 tends to follow the reference pressure but, at the higher level of reference pressure, there is greater flow at rated speed through orifice 83 and valve 78 which maintains an increase in the pressure difference between the reference and control pressure. The ultimate steady state condition will be that valve 106 is centered, the reference and control pressures have been readjusted, and the power turbine speed is exactly at the rated value.

Assuming the contrary example, that the power turbine load increases, resulting in underspeed, the valve 106 will move downwardly as illustrated to bleed pressure in chamber 118 to atmospheric. The sequence of operation described in detail above will be repeated, except that the action is reversed. The isochronous addition to the governing mechanism causes an increment to the fuel to eliminate the reduction in speed that would otherwise result from the droop characteristic of the governor 34′.

The second form of the invention, illustrated in FIGURE 3, presents a simpler approach to a solution of the same problem, with the advantage over the system of FIGURE 2 that no modification of the elements of the prior art fuel control of FIGURE 1 is necessary. The isochronous governing is accomplished by a small addition to the piping and a pressure control valve which adjusts the reference pressure as a function of changes in the control pressure so as to maintain the control pressure constant. The pressure control valve 131 as shown in FIGURE 3 is supplied a substantially constant regulated pressure through the pressure regulating valve 81 which is shown also in FIGURE 1. The control pressure which is derived from the reference pressure by bleeding through orifice 83 and the valve 78 in the power turbine governor 30 in series is supplied to the gas generator control 29 as in FIGURE 1 and also through a branch of line 79 to the pressure control valve 131. The reference pressure input to the gas generator control is not connected directly to line 82 as in FIGURE 1. Instead, it is connected through a line 133 to the control valve 131. A branch of line 133 is connected to an accumulator 85 which, as in the previous form, provides a slower response of the reference pressure to transients.

Control valve 131 is a valve which maintains a constant difference between the control pressure supplied to the gas generator control and the regulated pressure in line 82, and thus keeps the control pressure at a fixed level above ambient atmospheric pressure. It includes, as illustrated, a body 141 defining a valve cylinder 142 within which a valve stem 143 is reciprocable. In the null position of the valve, the stem blocks communication to line 133. As the stem moves upward, regulated pressure line 82 is connected through a port 145 in the stem to line 133. If it moves downward, the reference pressure in line 133 is bled through a passage 146 in the stem 143 to the control pressure line 79. Passage 146 extends out the end of stem 146 and thus through a diaphragm 147 mounted in the body and connected to the stem 143. A compression spring 149 is disposed between the upper end of stem 143 and an adjustable abutment 150. The regulated pressure in line 82 is exerted against the lower end of the stem 143 in a chamber 151 below the stem and against the diaphragm 147 through a branch of line 82 leading to a chamber 153 below diaphragm 147. The constant regulated pressure thus tends to move the valve stem upwardly. Control pressure is communicated by line 79 to the chamber 155 above the diaphragm. It will be clear that the valve acts to vary the reference pressure so as to maintain a constant difference between the regulated and control pressures. The force exerted on the valve stem is proportional to the difference between the regulated and control pressures and is also equal to the force of spring 149. Thus, for the valve to be in null position, the control pressure must be a constant amount less than the regulated pressure.

It follows therefore that when the power turbine governor acts to change the control pressure this reacts upon valve 131 to cause an equal change in the reference pressure. The change reference pressure will, of course, tend to counteract the change in control pressure on diaphragm 86. The ultimate result of the interaction of the power turbine governor, the gas generator control, and the engine will thus be in operation, with a new level of reference pressure, at the preset governing speed.

It will be apparent that the steady state condition will be reached only when the power turbine governor is on the isochronous governing speed from the fact that, since valve 131 maintains the difference between the regulated pressure in line 82 and the control pressure in line 79 constant, the flow through orifice 83 between these lines will also be constant. Moreover, control pressure in line 79 will be at a constant value above atmospheric since it is a constant value below a regulated pressure which is a constant amount above atmospheric. Thus, the pressure drop across valve 78 and the flow across valve 78 will have to be constant for the system to be in its steady state. Obviously, therefore, the opening of valve 78 must be constant, and therefore the speed of the power turbine. Thus, by the addition of a simple pressure differential control valve to the governing system of FIGURE 1, the system has been made isochronous. The reference pressure will be altered to the extent necessary to isochronize the operation after any change in power turbine load.

It will be apparent that the governing mechanisms shown in FIGURES 2 and 3 can be used in connection with differential pressure responsive governing means to control a single-shaft gas turbine. If the turbine has only a single turbine, such as either of the two turbines 7 and 9 shown in FIGURE 1, and this turbine is connected both to the compressor and to the load, there is, in effect, only a single shaft in the engine. All of the parts rotate at the same speed. In the two-shaft engine the isochronous control is effected by the output shaft, which is the one the speed of which is significant so far as the load is concerned. If there is but a single shaft, this shaft is used both for the droop governing control and for the isochronizing. In this case, both the control 29 and the governor 30 would be driven from the same shaft and, effectively at least, at the same speed, but this would not alter the mode of operation of governor 30 in connection with the structure shown in FIGURE 2 or in FIGURE 3 to act upon the control 29 to eliminate the droop from the governor characteristic.

The advantages of the two forms of the invention, and particularly the form of FIGURE 3, in providing a simple isochronous governor will be clear to those skilled in the art. The detailed description of preferred embodiments of the invention for the purpose of explaining the principles thereof is not to be considered as limiting the invention, since many modifications may be made by the exercise of skill in the art.

I claim:

1. An isochronous governing system for a gas turbine engine comprising, in combination,
    a control device responsive to speed of the engine,
    engine fuel controlling means regulated by the control device,
    a differential pressure responsive device coupled to the fuel controlling means so as to modify engine speed from that resulting from action of the control device,
    a governor responsive to speed of the engine,
    means providing fluid at a reference pressure,
    means actuated by the governor effective to provide fluid at a control pressure less than the reference pressure,
    the reference and control pressures being supplied to the differential pressure responsive device so that engine speed is varied progressively with variation in the difference between the two said pressures,
    and means responsive to a condition indicative of deviation of the engine from the desired speed setting effective to modify the reference pressure to the extent required to cause isochronous operation of the engine including a differential pressure regulating valve, responsive to the control pressure and to a constant pressure, effective to vary the reference pressure so as to maintain the control pressure constant.

2. An isochronous governing system for a gas turbine engine comprising, in combination,
    a control device responsive to speed of the engine,
    engine fuel controlling means regulated by the control device,
    a differential pressure responsive device coupled to the fuel controlling means so as to modify engine speed from that resulting from action of the control device,
    a governor responsive to speed of the engine,
    means providing fluid at a reference pressure,
    means actuated by the governor effective to provide fluid at a control pressure less than the reference pressure,
    including means for bleeding fluid from the control pressure through a variable valve controlled by the governor,
    the reference and control pressures being supplied to the differential pressure responsive device so that engine speed is varied progressively with variation in the difference between the two said pressures,
    and means responsive to a condition indicative of deviation of the engine from the desired speed setting effective to modify the reference pressure to the extent required to cause isochronous operation of the engine including a differential pressure regulating valve responsive to the control pressure and to a constant pressure effective to vary the reference pressure so as to maintain the control pressure constant.

3. An isochronous governing system for a gas-coupled gas turbine engine having a gas generator turbine and a power turbine comprising, in combination,
    a control device responsive to the speed of the gas generator turbine,
    engine fuel controlling means regulated by the control device,
    a differential pressure responsive device coupled to the said fuel controlling means to operate said fuel controlling means so as to modify gas generator turbine speed from that resulting from action of the control device,
    a governor responsive to speed of the power turbine,
    means providing fluid at a reference pressure,
    means actuated by the governor effective to provide fluid at a control pressure less than the reference pressure,
    the reference and control pressures being supplied to the differential pressure responsive device so that gas generator turbine speed is varied progressively with variation in the difference between the two said pressures,
    and means responsive to a condition indicative of deviation of the power turbine from the desired speed setting effective to modify the reference pressure to the extent required to cause isochronous operation of the power turbine.

4. A governing system as recited in claim 3 in which the means providing fluid at the reference pressure includes a regulating valve and the last-recited means includes a valve moved by the governor effective to vary the pressure to which the regulating valve is referenced whenever the governor indicates an off-speed condition.

5. A governing system as recited in claim 3 in which the last-recited means includes a differential pressure regulating valve responsive to the control pressure and to a constant regulated pressure effective to vary the reference pressure so as to maintain the control pressure constant.

6. A governing system as recited in claim 3 in which the means to provide fluid at the control pressure includes means for bleeding fluid from the control pressure through a variable valve controlled by the governor.

7. An isochronous governing device comprising, in combination,
    speed-responsive governing means including means responsive to the speed of the governed device and a governor effective to control the speed of the governed device with a droop characteristic, a throttling valve varied by the speed-responsive means as a function of the speed of the governed device, a source of servo fluid under pressure including regulating means operative to maintain the servo fluid at a constant pressure, a circuit connecting servo fluid at the constant pressure through an orifice and the throttling valve in series to an exhaust to develop a control pressure between the orifice and the valve, means responsive to the control pressure and the constant pressure operative to supply servo fluid at a reference pressure, the last-mentioned means being operative to vary the reference pressure in the opposite sense to variations in the control pressure, and governor isochronizing means responsive differentially to the reference and control pressures effective to vary the speed of the governed device, the variation in speed isochronizing the governed device and acting through the said throttling valve to maintain the control pressure constant.

8. A device as recited in claim 7 in which the means to supply servo fluid at a reference pressure includes a biased valve actuated by the differential between control pressure and the constant pressure and operative to connect the reference pressure selectively to the control or the constant pressure.

References Cited

UNITED STATES PATENTS

| | | | |
|---|---|---|---|
| 2,896,652 | 7/1959 | Goetsch et al. | 137—34 |
| 2,986,126 | 5/1961 | Werts | 137—34 X |
| 3,070,073 | 12/1962 | Adams et al. | 158—36.3 |
| 3,073,329 | 1/1963 | Kast | 60—39.28 X |

JULIUS E. WEST, *Primary Examiner.*